US010987818B2

(12) United States Patent
Kossett et al.

(10) Patent No.: US 10,987,818 B2
(45) Date of Patent: Apr. 27, 2021

(54) MAGNETIC LOCK FOR THROWABLE ROBOT

(71) Applicant: ReconRobotics, Inc., Edina, MN (US)

(72) Inventors: Alex J. Kossett, Minnetonka, MN (US); Andrew Drenner, Bloomington, MN (US)

(73) Assignee: ReconRobotics, Inc., Edina, MN (US)

( * ) Notice: Subject to any disclaimer, the term of this patent is extended or adjusted under 35 U.S.C. 154(b) by 134 days.

(21) Appl. No.: 15/998,672

(22) Filed: Aug. 15, 2018

(65) Prior Publication Data

US 2019/0054641 A1  Feb. 21, 2019

Related U.S. Application Data

(60) Provisional application No. 62/545,914, filed on Aug. 15, 2017.

(51) Int. Cl.
*B25J 19/02* (2006.01)
*B62D 57/02* (2006.01)
(Continued)

(52) U.S. Cl.
CPC ............. *B25J 19/027* (2013.01); *B25J 5/007* (2013.01); *B25J 19/023* (2013.01);
(Continued)

(58) Field of Classification Search
CPC ........ B25J 19/027; B25J 5/007; B25J 19/023; G07C 9/00174; G07C 9/00896;
(Continued)

(56) References Cited

U.S. PATENT DOCUMENTS 1,408,885 A    3/1922   Humphrey
2,818,301 A    12/1957  Hayden
(Continued)

FOREIGN PATENT DOCUMENTS

CN    202138435 U    2/2012
CN    104228998      12/2014
(Continued)

OTHER PUBLICATIONS

International Search Report for Application No. PCT/US2018/000198 dated Dec. 17, 2018 (12 pgs.).
(Continued)

*Primary Examiner* — Ruth Ilan
*Assistant Examiner* — Felicia L. Brittman
(74) *Attorney, Agent, or Firm* — Christensen, Fonder, Dardi & Herbert PLLC (57) ABSTRACT

A two wheeled throwable robot comprises an elongate chassis with two ends, a motor at each end, drive wheels connected to the motors, and a tail extending from the elongate chassis. The throwable robot includes an enable/disable arrangement comprising a pair of magnets generating a magnetic field and a magnetic field sensor positioned in proximity to the pair of magnets. The sensor is activated upon the occurrence of a specific modification of the magnetic field. The throwable robot may include a key member formed of a material to modify the magnetic field to enable the robot.

18 Claims, 13 Drawing Sheets

(51) Int. Cl.
  *B60R 16/023* (2006.01)
  *B25J 5/00* (2006.01)
  *G07C 9/00* (2020.01)
  *F41H 7/00* (2006.01)
  *B60K 1/02* (2006.01)

(52) U.S. Cl.
  CPC .......... *B60R 16/0231* (2013.01); *B62D 57/02* (2013.01); *F41H 7/005* (2013.01); *G07C 9/00174* (2013.01); *G07C 9/00896* (2013.01); *B60K 1/02* (2013.01); *B60Y 2200/24* (2013.01)

(58) Field of Classification Search
  CPC ..... F41H 7/005; B62D 57/02; B60R 16/0231; B60Y 2200/24; B60K 1/02; G06K 7/06; G06K 7/084
  USPC .................................. 180/8.1; 235/449, 450
  See application file for complete search history.

(56) References Cited

U.S. PATENT DOCUMENTS

| | | | |
|---|---|---|---|
| 3,896,292 A * | 7/1975 | May | G06K 7/087 |
| | | | 235/450 |
| 4,061,199 A | 12/1977 | Last | |
| 4,300,308 A | 11/1981 | Ikeda | |
| 4,334,221 A | 6/1982 | Rosenhagen et al. | |
| 4,402,158 A | 9/1983 | Seki et al. | |
| 4,406,085 A | 9/1983 | Rhodes | |
| 4,443,968 A | 4/1984 | Law | |
| 4,572,530 A | 2/1986 | Marino | |
| 4,575,304 A | 3/1986 | Nakagawa et al. | |
| 4,648,853 A | 3/1987 | Siegfried | |
| 4,736,826 A | 4/1988 | White et al. | |
| 4,773,889 A | 9/1988 | Rosenwinkel et al. | |
| 4,899,945 A | 2/1990 | Jones | |
| 4,906,051 A | 3/1990 | Vilhauer, Jr. | |
| 4,913,458 A | 4/1990 | Hamilton | |
| 4,993,912 A | 2/1991 | King et al. | |
| 5,085,062 A | 2/1992 | Capdevila | |
| 5,129,709 A | 7/1992 | Klamer | |
| D338,474 S | 8/1993 | Christensen | |
| 5,241,380 A | 8/1993 | Benson et al. | |
| 5,350,033 A | 9/1994 | Kraft | |
| 5,473,364 A | 12/1995 | Burt | |
| 5,487,692 A | 1/1996 | Mowrer et al. | |
| 5,551,545 A | 9/1996 | Gelfman | |
| 5,554,914 A | 9/1996 | Miyazawa | |
| 5,576,605 A | 11/1996 | Miyazawa | |
| 5,596,255 A | 1/1997 | Miyazawa | |
| 5,610,488 A | 3/1997 | Miyazawa | |
| 5,721,691 A | 2/1998 | Wuller et al. | |
| 5,732,074 A | 3/1998 | Spaur et al. | |
| 5,759,083 A | 6/1998 | Polumbaum et al. | |
| 5,762,533 A | 6/1998 | Tilbor et al. | |
| 5,781,005 A | 7/1998 | Vig et al. | |
| 5,839,795 A | 11/1998 | Matsuda et al. | |
| 5,871,386 A | 2/1999 | Bart et al. | |
| 5,888,135 A | 3/1999 | Barton, Jr. et al. | |
| 5,908,454 A | 6/1999 | Zyburt et al. | |
| 6,046,565 A | 4/2000 | Thorne | |
| 6,066,026 A | 5/2000 | Bart et al. | |
| 6,101,951 A | 8/2000 | Sigel | |
| 6,109,568 A | 8/2000 | Gilbert et al. | |
| 6,199,880 B1 | 3/2001 | Favorito et al. | |
| 6,313,724 B1 | 11/2001 | Osterweil | |
| 6,322,088 B1 | 11/2001 | Klamer et al. | |
| 6,502,657 B2 | 1/2003 | Kerrebrock et al. | |
| 6,548,982 B1 | 4/2003 | Papanikolopoulos et al. | |
| 6,574,536 B1 | 6/2003 | Kawagoe et al. | |
| 6,824,508 B2 | 11/2004 | Kim et al. | |
| 6,860,346 B2 | 3/2005 | Burt et al. | |
| 6,902,464 B1 | 6/2005 | Lee | |
| D540,503 S | 4/2007 | Tsang | |
| 7,249,640 B2 | 7/2007 | Horchler et al. | |
| D584,366 S | 1/2009 | Bowen et al. | |
| 7,559,385 B1 | 7/2009 | Burt et al. | |
| D626,577 S | 11/2010 | Carlson et al. | |
| 7,926,598 B2 * | 4/2011 | Rudakevych | B62D 55/06 |
| | | | 180/8.1 |
| D637,217 S | 5/2011 | Carlson et al. | |
| 8,186,469 B2 | 5/2012 | Yim et al. | |
| 8,342,440 B2 | 1/2013 | Papanikolopoulos et al. | |
| 8,496,077 B2 | 7/2013 | Nesnas et al. | |
| 8,505,667 B2 | 8/2013 | Kim et al. | |
| 8,636,096 B2 | 1/2014 | Kim et al. | |
| 8,776,977 B2 | 7/2014 | Lansberry et al. | |
| 8,978,807 B2 * | 3/2015 | Parness | B60B 15/025 |
| | | | 180/218 |
| 9,020,639 B2 | 4/2015 | Bewley et al. | |
| 9,061,544 B2 | 6/2015 | Carlson et al. | |
| 9,557,740 B2 | 1/2017 | Crawley | |
| 9,733,720 B2 | 8/2017 | Kavli et al. | |
| 1,004,681 A1 | 8/2018 | Sellner et al. | |
| 10,046,819 B1 * | 8/2018 | Sellner | B60K 7/0007 |
| 2003/0038607 A1 | 2/2003 | Yim et al. | |
| 2003/0092964 A1 | 5/2003 | Kim et al. | |
| 2003/0137268 A1 | 7/2003 | Papanikolopoulos et al. | |
| 2004/0000439 A1 | 1/2004 | Burt et al. | |
| 2008/0143065 A1 | 6/2008 | DeFazio et al. | |
| 2009/0099709 A1 | 4/2009 | Troy | |
| 2010/0032224 A1 | 2/2010 | Liu | |
| 2010/0152922 A1 | 6/2010 | Carlson et al. | |
| 2010/0318059 A1 | 12/2010 | Farritor et al. | |
| 2012/0059520 A1 | 3/2012 | Kossett | |
| 2012/0073930 A1 | 3/2012 | Lansberry et al. | |
| 2012/0137862 A1 | 6/2012 | Kossett et al. | |
| 2014/0208976 A1 | 7/2014 | Jung et al. | |
| 2015/0045948 A1 * | 2/2015 | Bjorn | H01H 27/00 |
| | | | 700/245 |
| 2015/0175202 A1 | 6/2015 | MacGregor et al. | |
| 2019/0099894 A1 * | 4/2019 | Mimlitch, III | B25J 5/007 |
| 2019/0126157 A1 * | 5/2019 | Hayashi | A63H 11/00 |

FOREIGN PATENT DOCUMENTS

| | | |
|---|---|---|
| EP | 1870254 | 12/2007 |
| FR | 2567078 | 1/1986 |
| JP | 63-269701 | 10/1996 |
| JP | 10-69314 | 3/1998 |
| KR | 10-1184023 | 9/2012 |
| KR | 10-1217846 | 1/2013 |
| KR | 10-1226261 | 1/2013 |
| KR | 10-20110139912 | 1/2013 |
| KR | 10-2014-0097709 | 8/2014 |
| RU | 89837 U1 | 12/2009 |
| WO | WO2002/24417 | 3/2002 |
| WO | WO2013/059515 | 4/2013 |
| WO | WO2013/103171 | 7/2013 |

OTHER PUBLICATIONS

International Search Report for Application No. PCT/US2018/000182 dated Jan. 3, 2019 (16 pgs.).

International Search Report for Application No. PCT/US2018/000161 dated Dec. 14, 2018 (19 pgs.).

* cited by examiner

MAGNETIC LOCK FOR THROWABLE ROBOT

CROSS-REFERENCE TO RELATED APPLICATIONS

The present application claims the benefit of U.S. Provisional Application No. 62/545,914, filed Aug. 15, 2017, which is incorporated herein in its entirety by reference.

BACKGROUND OF THE INVENTION

Throwable robots used in military and policing operations need to be robust and able to survive exposure to rugged conditions including water and vertical drops. Robots used in hostile military and policing operations require robust, reliable, and secure control systems, including enable-disable switches. Improvements in reliability and performance for robots used in high stakes military and police operations are desirable.

SUMMARY OF THE INVENTION

This invention relates to a means to readily, reliably, and securely enable or disable a device, for example a throwable robot. In one example, to detect the presence of a ferromagnetic component, in a tamper-resistant and environmentally-sealed manner. In embodiments, the throwable surveillance robot comprises a pair of axially aligned drive wheels, each wheel having a maximum diameter. The surveillance robot may have a body comprising a housing extending between the drive wheels. In embodiments, the housing is disposed completely within a cylinder defined by the maximum diameters of the drive wheels. In embodiments, the housing defines a housing cavity containing a receiver, a transmitter, and a video camera connected to the transmitter. The housing may include a key holding portion defining a key holding slot having a key member insertion and withdrawal axis. In embodiments, throwing of the surveillance robot is facilitated by a design providing a total weight of less than six pounds.

In embodiments, the surveillance robot comprises a first magnet and a second magnet disposed inside the housing cavity. The magnets may provide a magnetic flux field. Each magnet may be located near the key holding slot with a wall portion of the housing extending between each magnet and the key holding slot. The surveillance robot may also comprise a key member conforming to the key holding slot. In embodiments, the key member comprises a material with a relative electromagnetic permeability greater than five hundred so that the magnetic flux field produced by the magnets changes when the key member is disposed in the key holding slot. In embodiments, the magnets produce a first, undeformed magnetic field while the key member is disposed in the key holding slot and the magnets produce a second, deformed magnetic field while the key member is not disposed in the key holding slot.

In embodiments, the surveillance robot comprises a magnetic field sensor disposed inside the housing cavity. The magnetic field sensor may be, for example, positioned between the first magnet and the second magnet. In embodiments, the magnetic field sensor provides a first output signal when the first, undeformed magnetic field is present and a second output signal when the second, deformed magnetic field is present. In some embodiments, the first output signal is a logical one and the second output signal is a logical zero. In other embodiments, the first output signal is a logical zero and the second output signal is a logical one. In embodiments, the housing includes a wall portion separating the key holding slot from the housing cavity. In embodiments, each magnet is located near the key holding slot with the wall portion of the housing extending between each magnet and the key holding slot.

The magnetic field sensor may comprise, for example, a Hall effect sensor. In embodiments, the presence of the key member in the key holding slot defined by the key holding portion alters a magnitude of the magnetic field produced by the magnets at the magnetic field sensor. For example, the magnetic field produced by the magnets may have a first magnitude at the magnetic field sensor while the key member is present in the key holding slot and a second magnitude at the magnetic field sensor while the key member is absent from the key holding slot. In embodiments, the presence of the key member in the key holding slot defined by the key holding portion alters an angle of flux lines in the magnetic field produced by the magnets at the magnetic field sensor. For example, the flux lines in the magnetic field produced by the magnets may have a first angle at the magnetic field sensor while the key member is present in the key holding slot and a second angle at the magnetic field sensor while the key member is absent from the key holding slot.

The above summary is not intended to describe each illustrated embodiment or every implementation of the present disclosure.

DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 6A and FIG. 6B are perspective views showing a key member and a portion of a throwable robot. In FIG. 6A, an arrow is used to illustrate the insertion motion of the key member. In the embodiment of FIG. 6B, the key member is shown residing in an inserted position.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Figure 1:
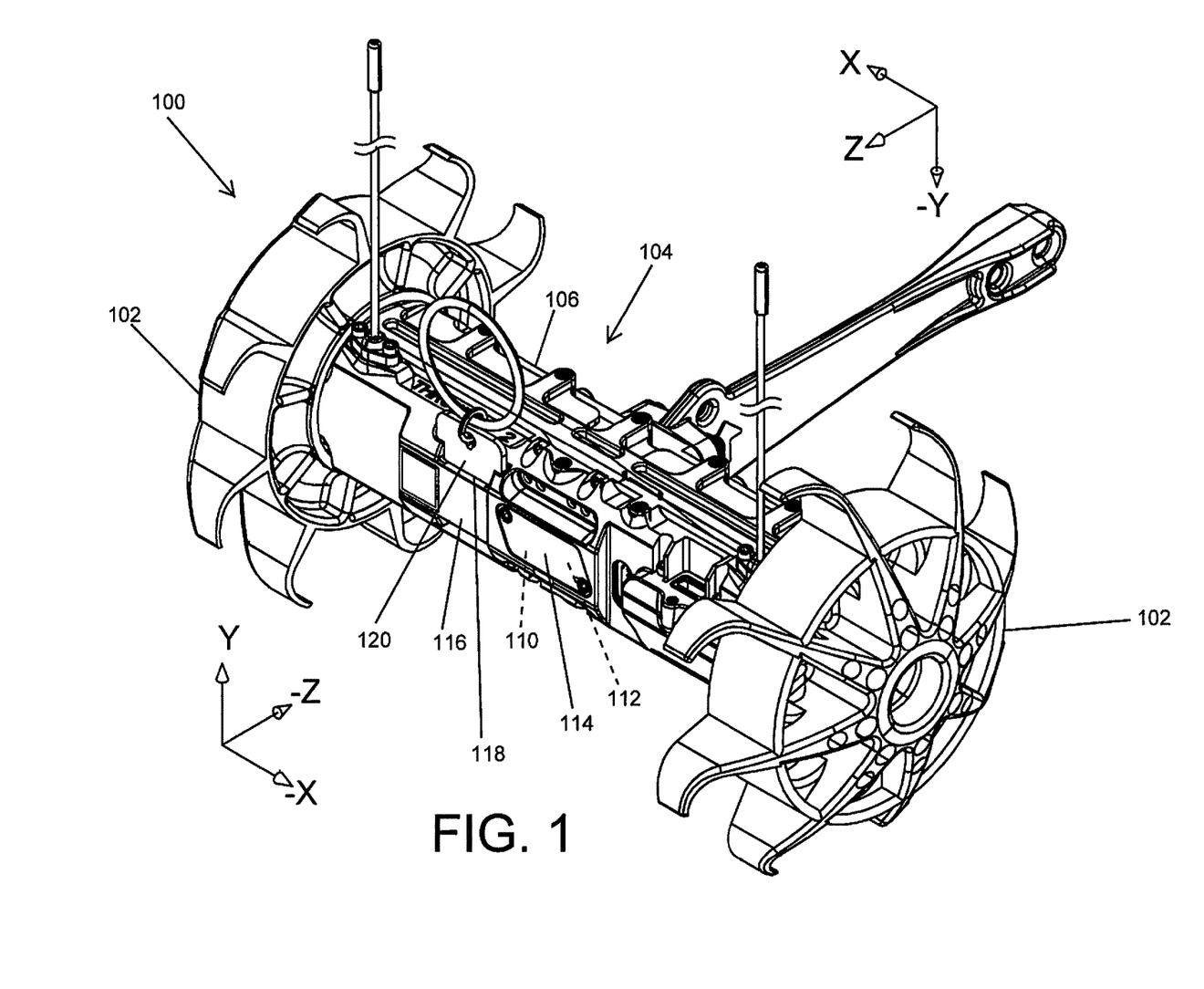
FIG. 1 is a top, front, left perspective view of a throwable robot in accordance with the detailed description.
Figure 2:
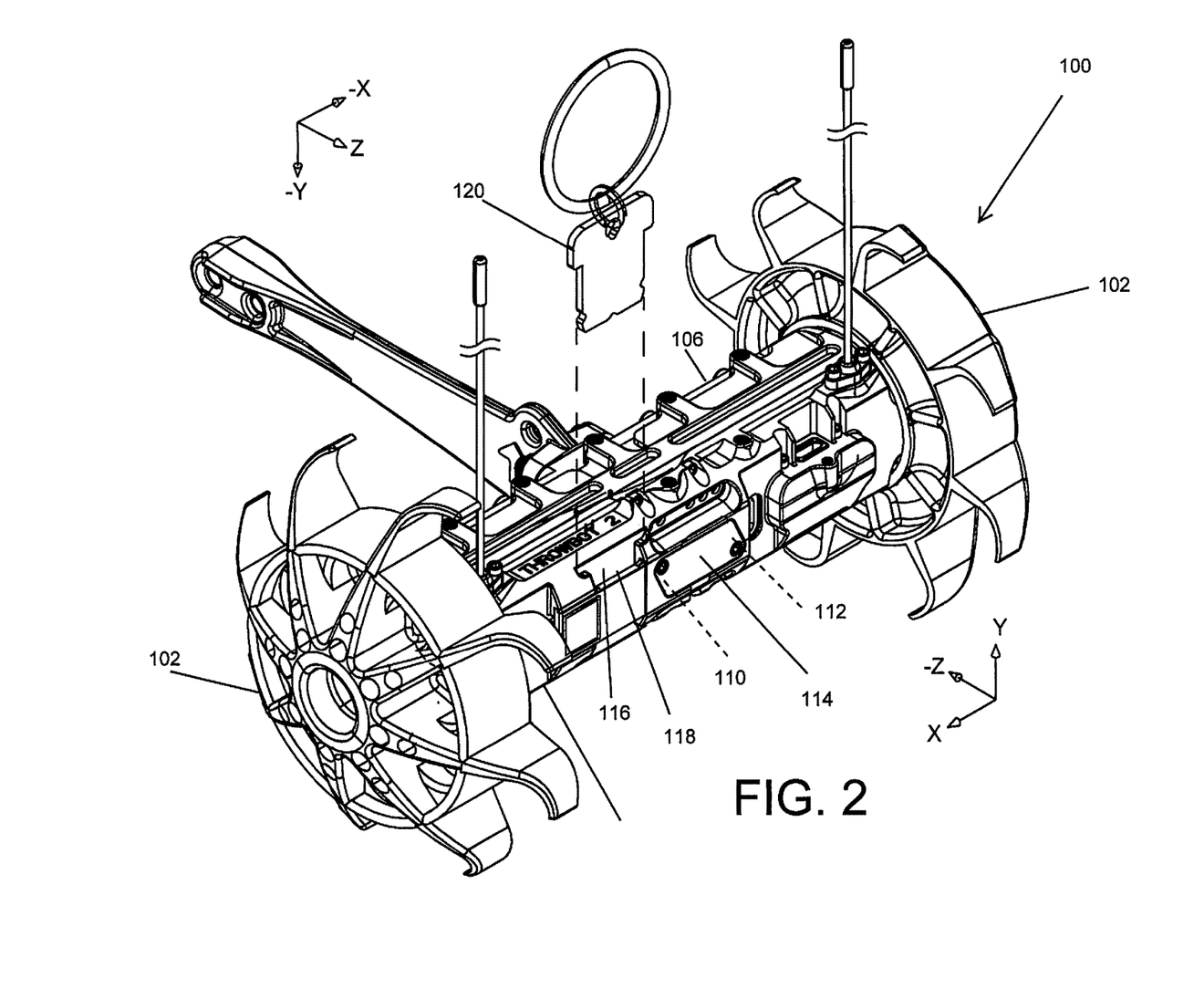
FIG. 2 is a partially exploded perspective view showing a key member and a throwable robot that is activated and/or deactivated using the key member.
Figure 3:
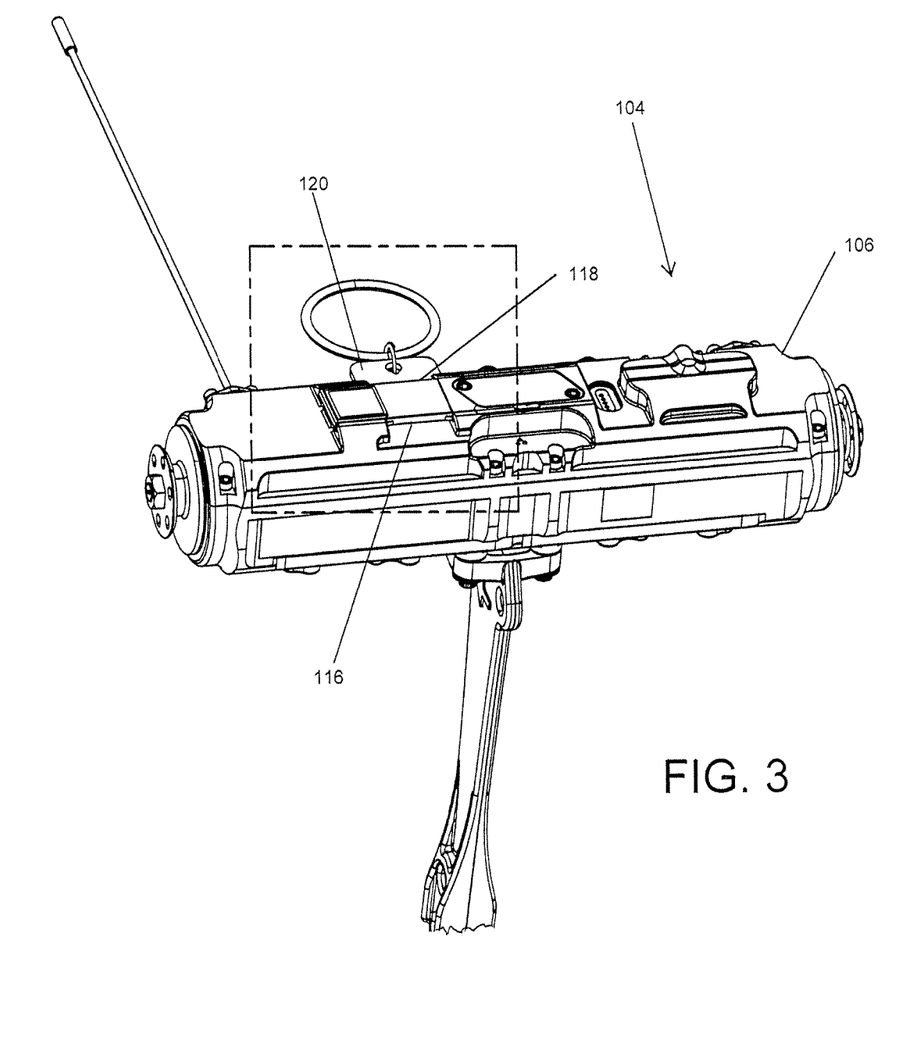
FIG. 3 is a perspective view showing a portion of a throwable robot. In the embodiment of FIG. 3, the wheels have been removed for purposes of illustration.
Figure 4:
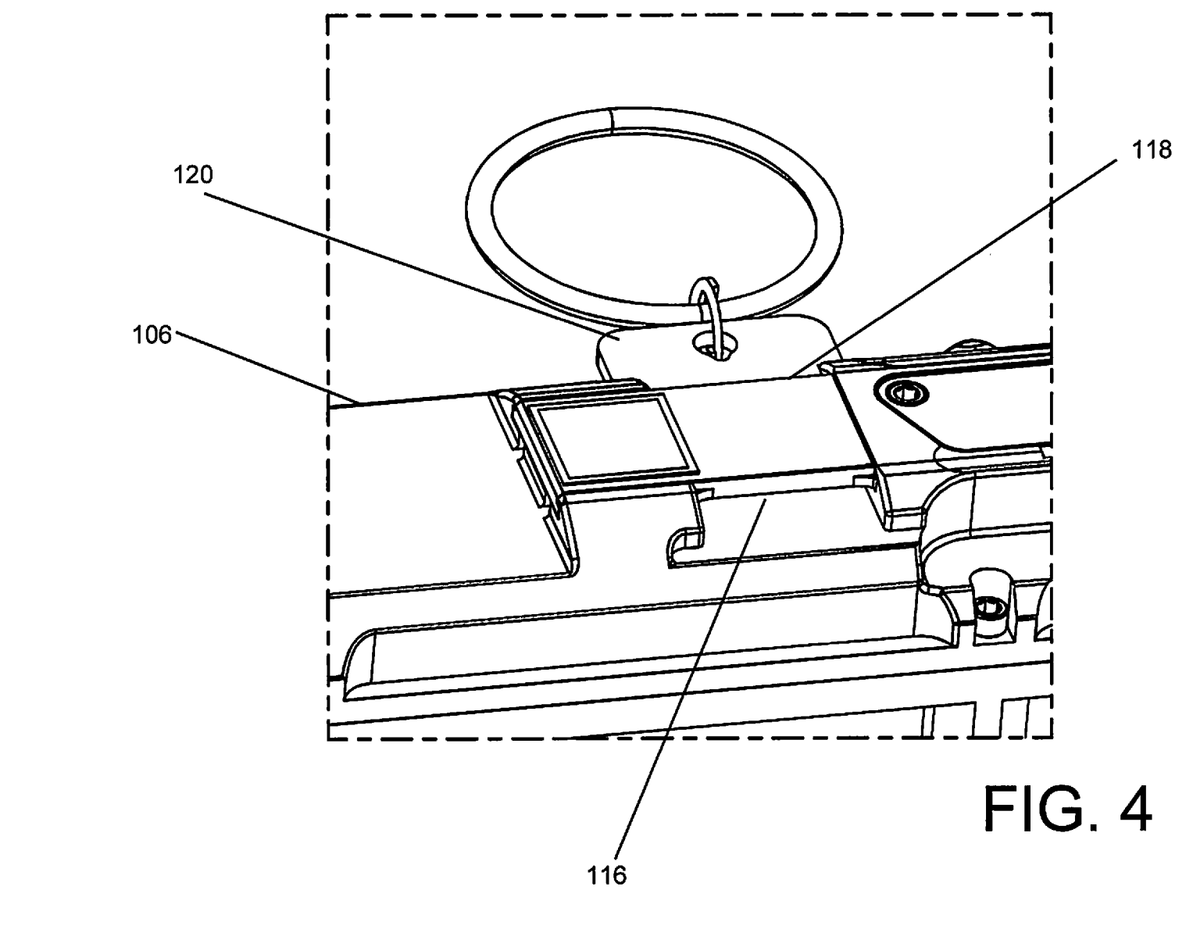
FIG. 4 is an enlarged view showing a portion of the throwable robot shown in FIG. 3.
Figure 5:
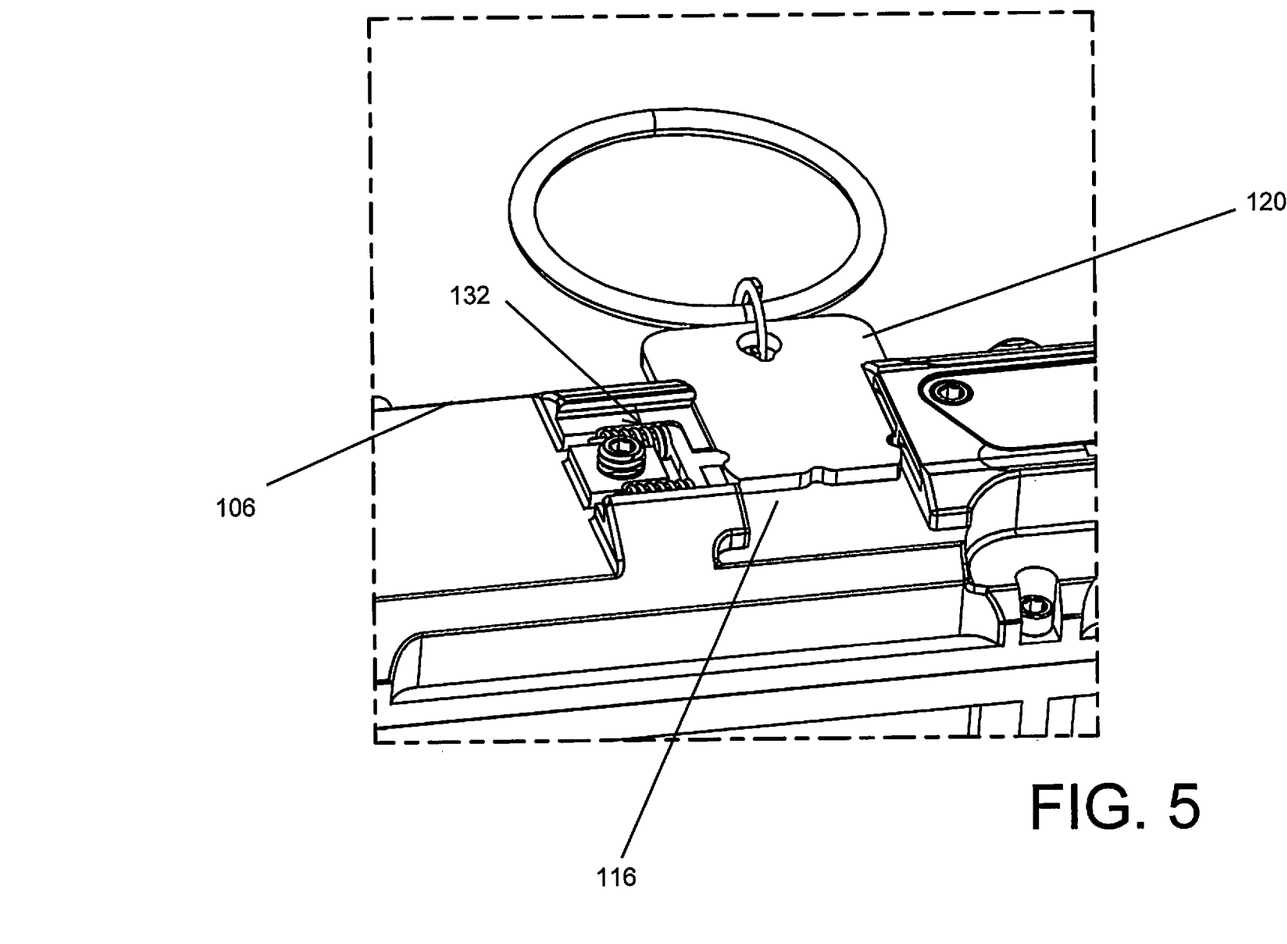
FIG. 5 is an additional view showing the portion of the throwable robot shown in FIG. 4. In the embodiment of FIG. 5, a portion of the throwable robot has been removed. A key member, a key receiving slot, and a key retaining mechanism are visible in FIG. 5.
Figure 6A:
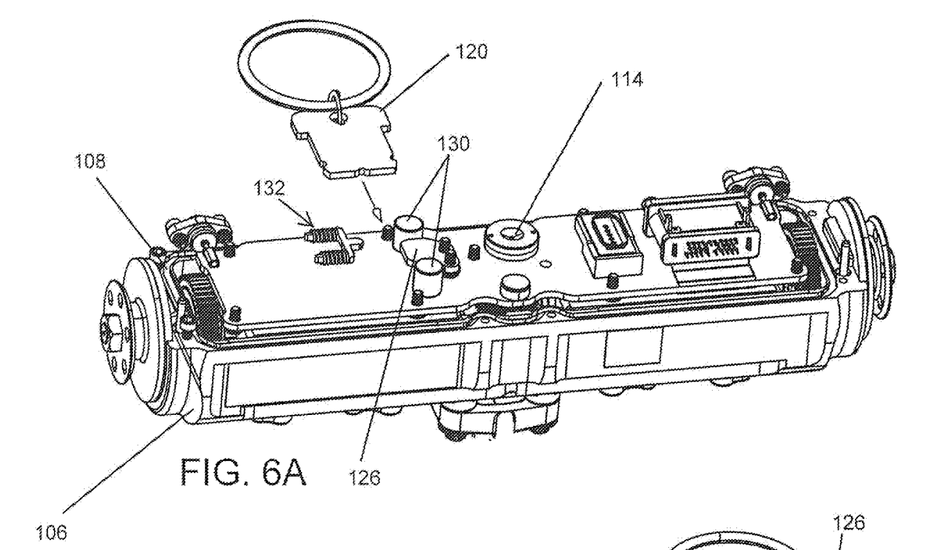
Figure 6B:
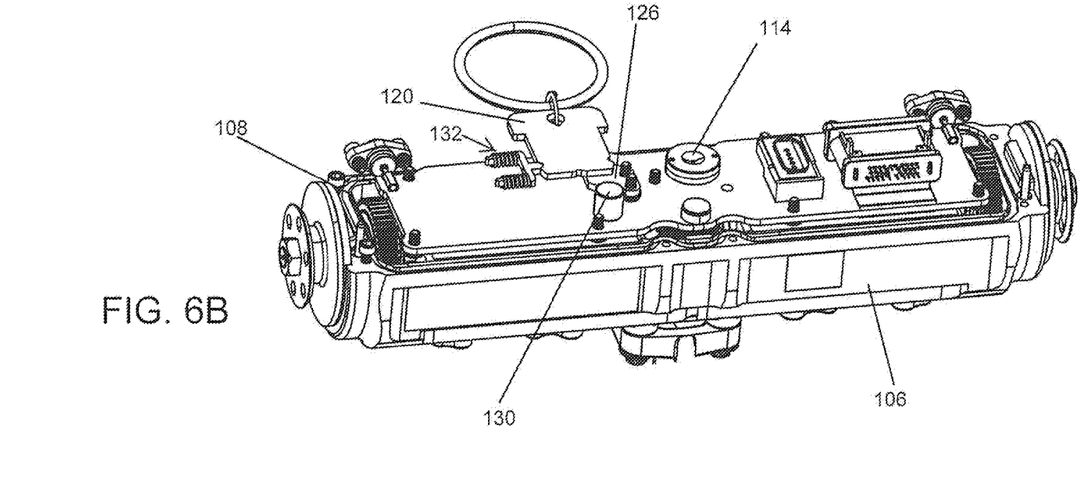
Figure 7:
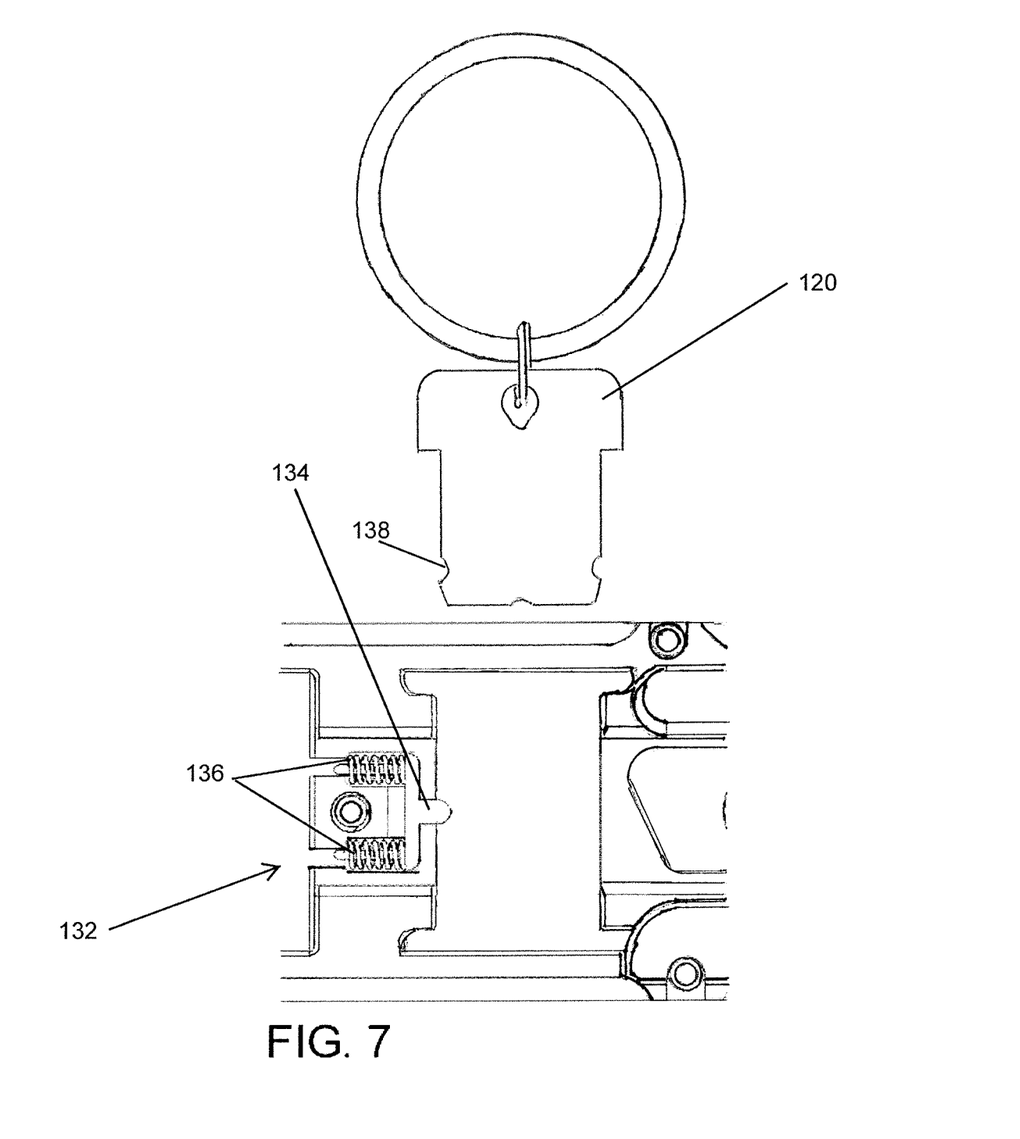
FIG. 7 is a diagrammatic front view showing a key member and a portion of a throwable robot that is activated and/or deactivated using the key member.
Figure 8:
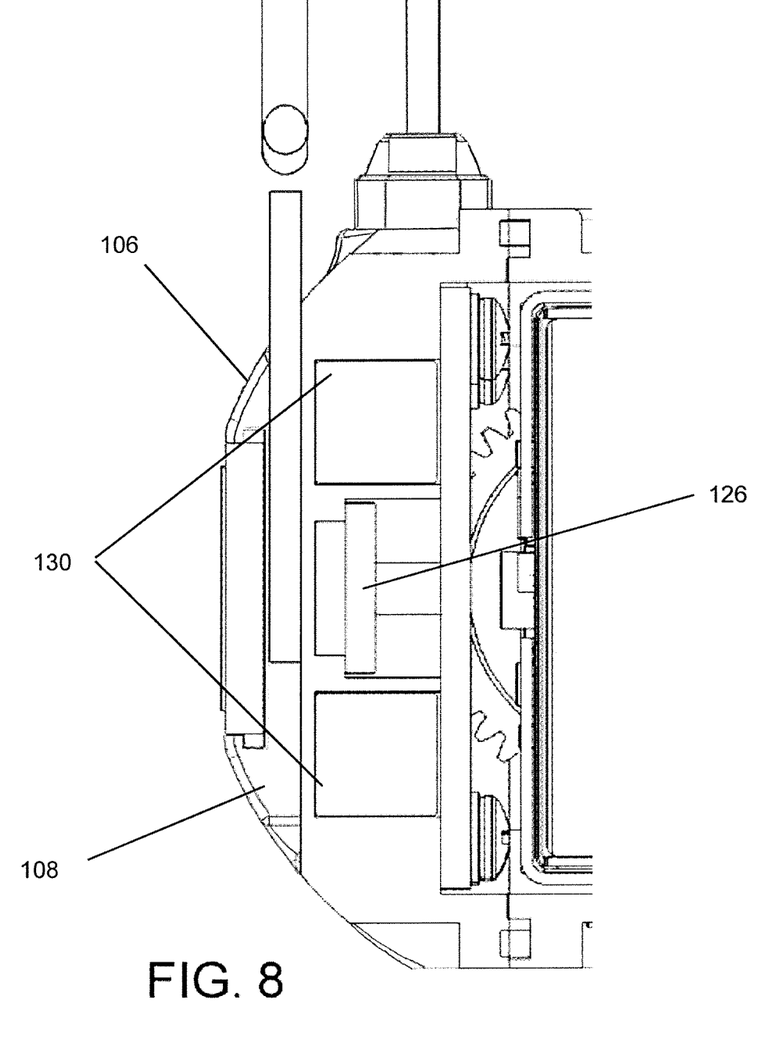
FIG. 8 a is stylized cross-sectional view showing a key member and a portion of a throwable robot that is activated and/or deactivated using the key member.

Referring to FIGS. 1 and 2, in embodiments, a throwable surveillance robot 100 comprises a pair of axially aligned drive wheels 102, each wheel 102 having a maximum diameter. The surveillance robot 100 may have a body 104 comprising a housing 106 extending between the drive wheels 102. In embodiments, the housing 106 is disposed completely within a cylinder defined by the maximum diameters of the drive wheels 102. In embodiments, the housing 106 defines a housing cavity 108 containing a receiver 110, a transmitter 112, and a video camera 114 connected to the transmitter 112. The housing 106 may include a key holding portion 116 defining a key holding slot 118 having a key member insertion and withdrawal axis. In embodiments, throwing of the surveillance robot 100 is facilitated by a design providing a total weight of less than six pounds.

Referring to FIGS. 6A through 10B, in embodiments, the surveillance robot 100 comprises a first magnet 130 and a second magnet 130 disposed inside the housing cavity 108. The magnets 130 may provide a magnetic flux field. Each magnet 130 may be located near the key holding slot 118 with a wall portion of the housing 106 extending between each magnet 130 and the key holding slot 118. The surveillance robot 100 may also comprise a key member 120 conforming to the key holding slot 118. In embodiments, the key member 120 comprises a material with a relative electromagnetic permeability greater than 500 so that the magnetic flux field produced by the magnets 130 changes when the key member 120 is disposed in the key holding slot 118. In embodiments, the magnets 130 produce a first, undeformed magnetic field 122 while the key member 120 is disposed in the key holding slot 118 and the magnets 130 produce a second, deformed magnetic field 124 while the key member 120 is not disposed in the key holding slot 118.

Referring to FIGS. 6A, 8, 12A, and 12B, in embodiments, the surveillance robot 100 comprises a magnetic field sensor 126 disposed inside the housing cavity 108. The magnetic field sensor 126 may be, for example, positioned between the first magnet 130 and the second magnet 130. In embodiments, the magnetic field sensor 126 provides a first output signal when the first, undeformed magnetic field 122 is present and a second output signal when the second, deformed magnetic field 124 is present. In some embodiments, the first output signal is a logical one and the second output signal is a logical zero. In other embodiments, the first output signal is a logical zero and the second output signal is a logical one. In embodiments, the housing 106 includes a wall portion separating the key holding slot 118 from the housing cavity 108. In embodiments, each magnet 130 is located near the key holding slot 118 with the wall portion of the housing 106 extending between each magnet 130 and the key holding slot 118.

Referring to FIGS. 6A, 8, 10A, and 10B, the magnetic field sensor 126 may comprise, for example, a Hall effect sensor 128. In embodiments, the presence of the key member 120 in the key holding slot 118 defined by the key holding portion 116 alters a magnitude of the magnetic field produced by the magnets 130 at the magnetic field sensor 126. For example, the magnetic field produced by the magnets 130 may have a first magnitude at the magnetic field sensor 126 while the key member 120 is present in the key holding slot 118 and a second magnitude at the magnetic field sensor 126 while the key member 120 is absent from the key holding slot 118. In embodiments, the presence of the key member 120 in the key holding slot 118 defined by the key holding portion 116 alters an angle of flux lines in the magnetic field produced by the magnets 130 at the magnetic field sensor 126. For example, the flux lines in the magnetic field produced by the magnets 130 may have a first angle at the magnetic field sensor 126 while the key member 120 is present in the key holding slot 118 and a second angle at the magnetic field sensor 126 while the key member 120 is absent from the key holding slot 118.

Referring to FIGS. 5, 6A, 6B, and 7, in embodiments, the throwable surveillance robot comprises a key retention mechanism 132 comprising a key engaging element 134 that is slidingly supported by the housing and one or more coil springs 136 that bias the key engaging element 134 toward the key member. In embodiments, the key member defines a notch 138 that is positioned and dimensioned to receive a distal portion of the key engaging element 134.

Referring to FIGS. 1 and 2, a forward direction Z and a rearward direction −Z are illustrated using arrows labeled "Z" and "−Z," respectively. A port direction X and a starboard direction −X are illustrated using arrows labeled "X" and "−X," respectively. An upward direction Y and a downward direction −Y are illustrated using arrows labeled "Y" and "−Y," respectively. The directions illustrated using these arrows may be conceptualized, by way of example and not limitation, from the point of view of a viewer looking through the camera of the robot. The directions illustrated using these arrows may be applied to the apparatus shown and discussed throughout this application. The port direction may also be referred to as the portward direction. In one or more embodiments, the upward direction is generally opposite the downward direction. In one or more embodiments, the upward direction and the downward direction are both generally orthogonal to the ZX plane defined by the forward direction and the starboard direction. In one or more embodiments, the forward direction is generally opposite the rearward direction. In one or more embodiments, the forward direction and the rearward direction are both generally orthogonal to the XY plane defined by the upward direction and the starboard direction. In one or more embodiments, the starboard direction is generally opposite the port direction. In one or more embodiments, the starboard direction and the port direction are both generally orthogonal to the ZY plane defined by the upward direction and the forward direction. Various direction-indicating terms are used herein as a convenient way to discuss the objects shown in the figures. It will be appreciated that many direction indicating terms are related to the instant orientation of the object being described. It will also be appreciated that the objects described herein may assume various orientations without deviating from the spirit and scope of this detailed description. Accordingly, direction-indicating terms such as "upwardly," "downwardly," "forwardly," "backwardly," "portwardly," and "starboardly," should not be interpreted to limit the scope of the invention recited in the attached claims.

Figure 12A:
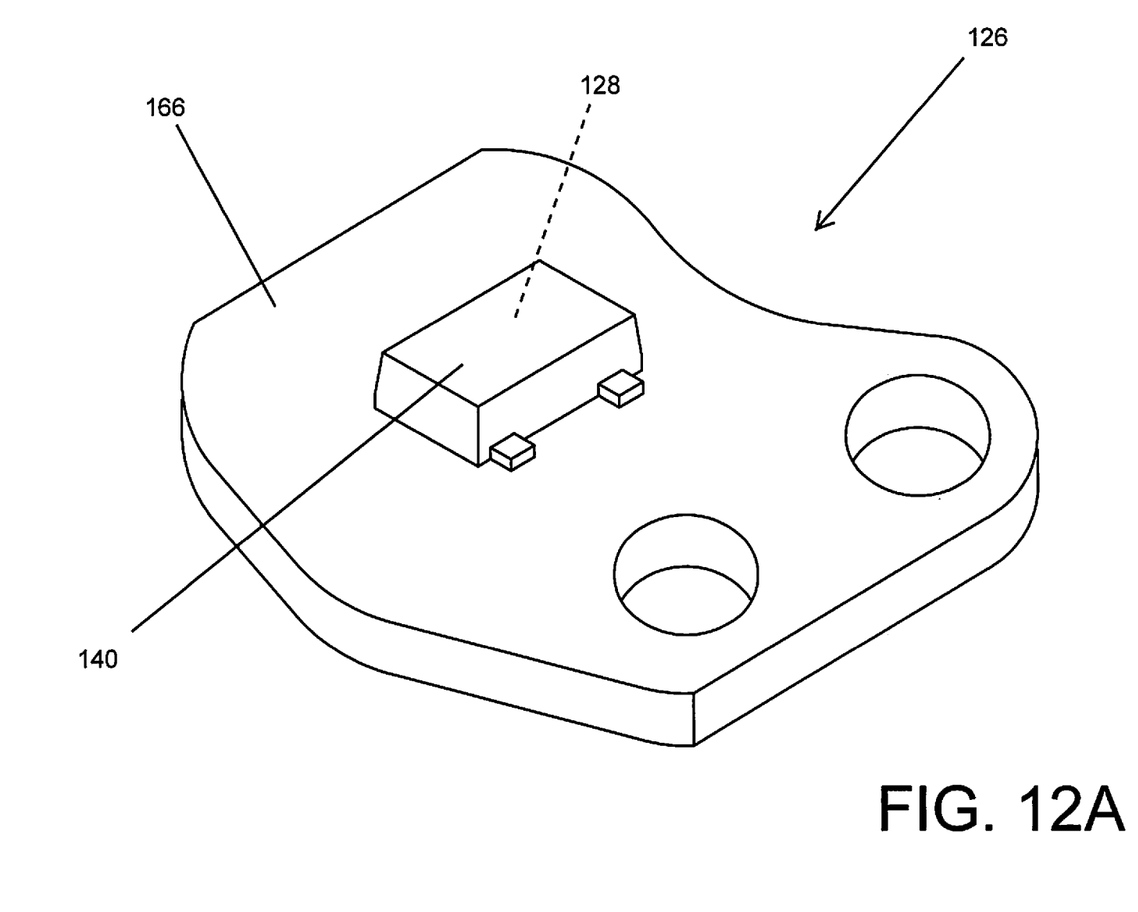
FIG. 12A is a perspective view of a circuit card assembly including a printed wiring board and a Hall effect sensor.
Figure 12B:
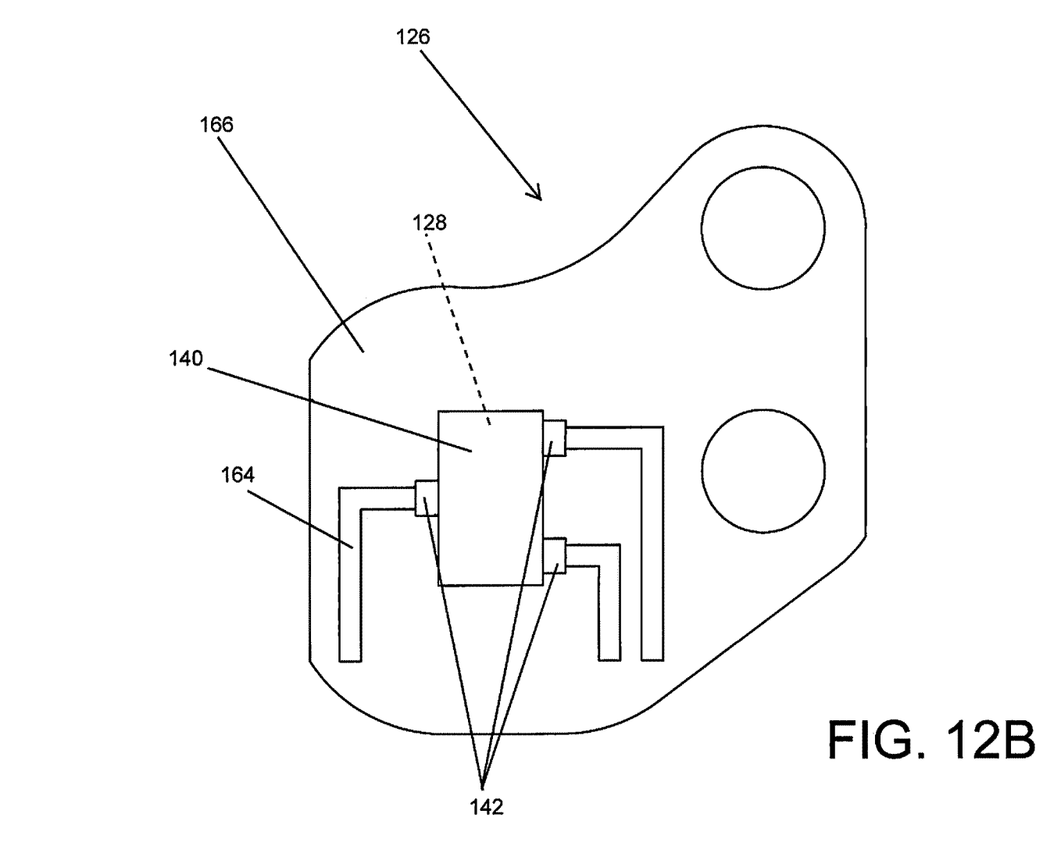
FIG. 12B is a top plan view of a circuit card assembly including a printed wiring board and a Hall effect sensor.

Referring to FIG. 12A and FIG. 12B, a printed wiring board 166 supporting circuitry 164 is shown. FIG. 12A and FIG. 12B may be collectively referred to as FIG. 12. In the embodiment of FIG. 12, the printed wiring board 166 comprises a substrate and the substrate supports a plurality of conductive paths 168 of the circuitry 164. In the example embodiment shown in FIG. 12, the circuitry 164 comprises the printed wiring board 166 and a plurality of electronic components 172 that are electrically connected to the conductive paths of the printed wiring board 166. The plurality of electronic components 172 are mechanically fixed and/or electrically connected to the printed wiring board 166 to form a circuit card assembly 170. In the embodiments of FIG. 12, the circuitry 164 includes a Hall effect sensor 128. In the embodiment of FIG. 12, the Hall effect sensor 128 comprises a semiconductor chip (not shown) disposed inside a casing 140. In the embodiment of FIG. 12, the Hall effect sensor 128 comprises three terminals 142.

Figure 9A:
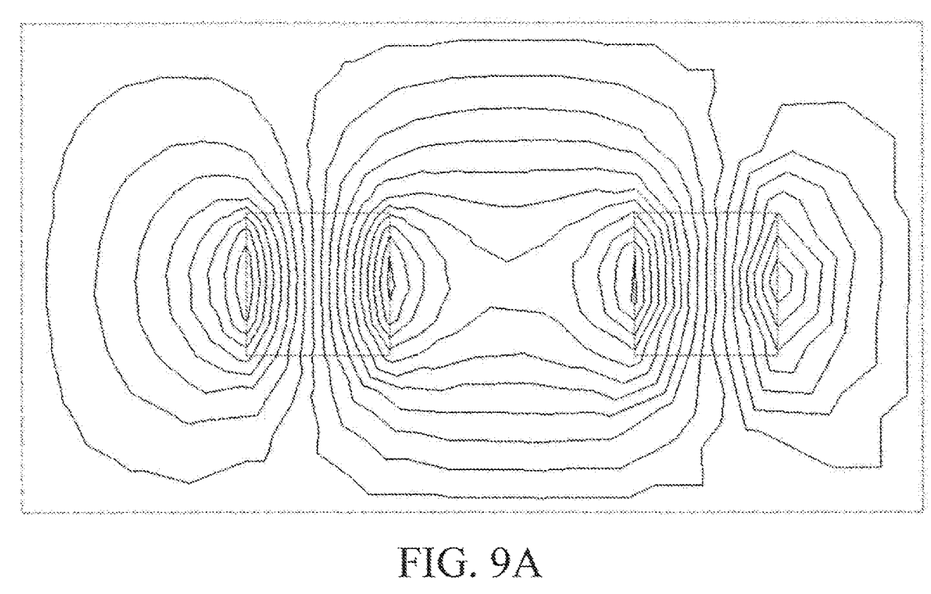
FIG. 9A is a diagram showing two magnets and lines of magnetic flux in a magnetic field produced by the two magnets.
Figure 9B:
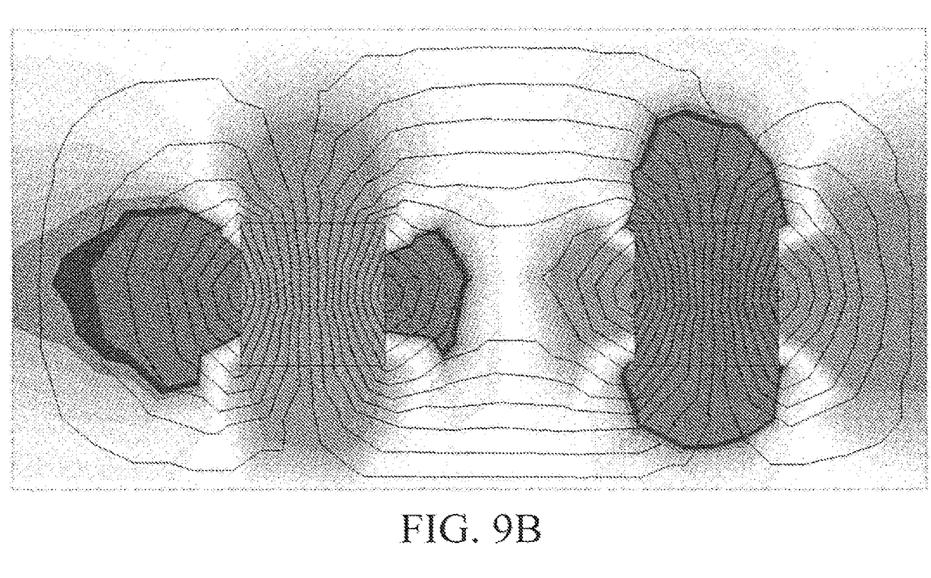
FIG. 9B is a diagram showing two magnets and lines of magnetic flux in a magnetic field produced by the two magnets.
Figure 10A:
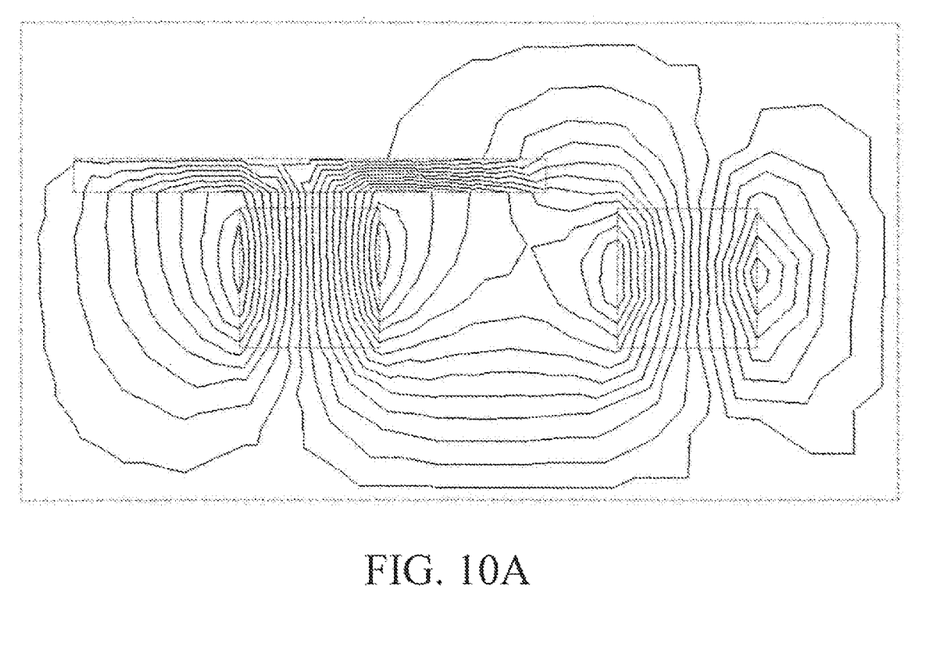
FIG. 10A is a diagram showing two magnets and lines of magnetic flux in a magnetic field produced by the two magnets. The path taken by the lines of magnetic flux is influenced by a key member in the embodiment of FIG. 10A.
Figure 10B:
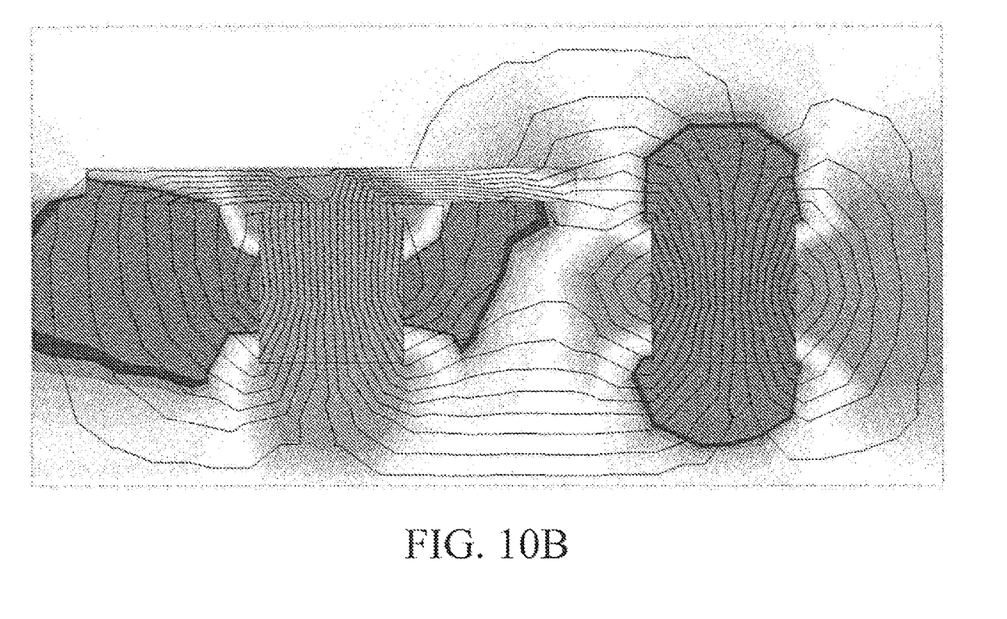
FIG. 10B is a diagram showing two magnets and lines of magnetic flux in a magnetic field produced by the two magnets. The path taken by the lines of magnetic flux is influenced by a key member in the embodiment of FIG. 10B.

In embodiments, two magnets are spaced some distance apart horizontally at a common elevation, with magnetic fields oriented vertically and with opposite polarities. Their locations are constrained by a non-ferromagnetic material which does not appreciably affect the resulting magnetic field relative to free space. Viewed from the side, the field lines representing the resulting magnetic field between the magnets forms a roughly elliptical shape, with a magnetic field strength at the very center of the distance between the magnets of ideally zero. In embodiments, a vertically-polarized magnetic sensor is placed midway between the two magnets, coplanar or slightly lower than coplanar with the tops of the magnets. This sensor may have a digital output that trips at a certain vertical magnetic field strength, and releases at a second vertical magnetic field strength. In embodiments, the sensor is not tripped due to the very low (near zero) vertical field strength where the sensor is located. Referring to FIG. 9A and FIG. 9B, two illustrations of magnetic field lines are shown. The black-and-white illustration shows magnetic field lines, and the color illustration shows the strength of the vertical component of the magnetic field (red is one polarity, purple is the opposite polarity, and yellow is a bin near zero). Referring to FIG. 10A and FIG. 10B, two illustrations of magnetic field lines are shown. FIG. 10A and FIG. 10B are similar to FIG. 9A and FIG. 9B, but with a plate made of ferromagnetic material (e.g., steel) placed near the tops of the magnets (e.g. on the other side of an outer wall of the device, e.g., 0.030" away). This plate or key member it placed such that it completely covers one magnet and the sensor, but does not extend over the second magnet. Due to the symmetry of the construction, the system could function regardless of which magnet is covered. The plate or key member disturbs the symmetry of the first configuration, resulting in a warped magnetic field. The resulting field has a substantially vertical component in the center of the system, where the magnetic field sensor is. This disturbance is of a large enough magnitude for the magnetic field sensor to detect its presence.

Figure 11:
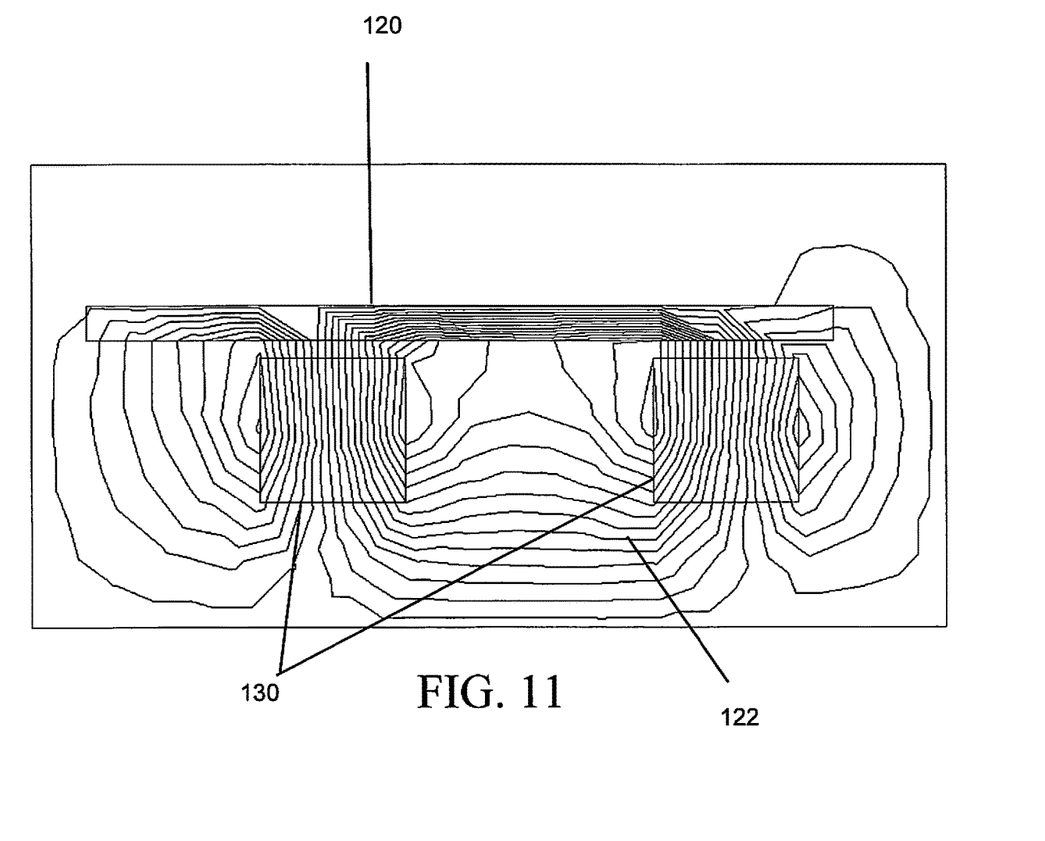
FIG. 11 is a diagram showing two magnets and lines of magnetic flux in a magnetic field produced by the two magnets. The path taken by the lines of magnetic flux is influenced by a key member in the embodiment of FIG. 11.

Referring to FIG. 11, another embodiment includes a plate or key member extending over two magnets and the magnetic field sensor. This restores symmetry to the magnetic field, and the sensor releases or does not trip due to the low field strength detected.

Because the sensor only trips in the second configuration, the surrounding structure of the device and the plate or key member can be constructed so as to reliably put the plate or key member at the correct location to detect it. In embodiments, a non-authorized user may have difficulty tripping the sensor, without the plate or key member. In embodiments, the sensor may not be tripped with a piece of ferromagnetic material, because the system is sensitive to the specific location and orientation of the plate or key member. In this way, the system can be used as a tamper-resistant means to turn a device on or off.

In embodiments, the two magnets may be, for instance, grade N52 Neodymium-Iron-Boron cylindrical magnets, with a diameter of ¼" and height of ¼". In embodiments, the field strength at the sensor location may be 2 mT without the plate or key member in place, and 100 mT with the plate or key member in place. In embodiments, the magnetic field sensor comprises a hall-effect type sensor with a typical trip point of 60 mT and a typical release point of 45 mT. Examples of hall-effect sensors that may be suitable in some applications include the Honeywell SL353LT hall-effect sensor. In embodiments, the housing wall thickness may be 0.030 inch. In embodiments, the plate or key member may be on the order of ¹⁄₁₆ inch thick. In embodiments, spacing between the magnets may be 0.700 inch center-to-center. Because of the symmetrical construction of the system, there may be wide latitude in selecting magnet strength and spacing. In embodiments, the above parameters may vary ±50%. In embodiments, the above parameters may vary by −60% and +150%.

An example alternate arrangement could include a single magnet, with the sensor placed at a specific distance from the magnet. This arrangement would rely on the exact strength of the magnetic field and the trip and release points of the sensors (the two-magnet design uses symmetry to be more robust to these factors). As a result, tolerances for the magnet, sensor, and relative placement of the elements would be important to the successful operation. This arrangement would not possess the tamper-resistant characteristics that arise from embodiments described above.

Note that the description herein refers to horizontal/vertical orientations for the sake of orienting components with respect to one another, but this does not restrict function of this system (e.g., the whole system could be rotated through an arbitrary angle along any axis and still function).

In embodiments, the plate or key member is retained in place by the magnetic force of the magnets. In an embodiment, the plate slides into a slot, the slot constraining the key member. The key member in the slot may be further retained by magnetic force from the one or more magnets.

In embodiments, the robot may include a plate extending across the two magnets, on the side of the magnets opposite the key member. The plate may comprise a material with an electromagnetic permeability that allows magnetic flux lines to flow through the plate. The use of this plate may allow the two magnets to be shorter (relative to an arrangement without the plate). The shorter magnets may facilitate a thinner total thickness for the arrangement including the two magnets, the plate, the sensor and the key member.

In embodiments the robot wheels are less than 6 inches in diameter. In embodiments, less than 5 inches. In embodiments, less than 4 inches. In embodiments, the robot weighs less than 5 pounds.

The following United States patents are hereby incorporated by reference herein: U.S. Pat. Nos. 10,046,819, 9,061,544, 6,548,982, 6,502,657, U.S. D637,217, and U.S. D626,577. Components illustrated in such patents may be utilized with embodiments herein. Incorporation by reference is discussed, for example, in MPEP section 2163.07(B).

The patents and other references mentioned above in all sections of this application are herein incorporated by reference in their entirety for all purposes.

All of the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed. The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

What is claimed is:

1. A throwable surveillance robot weighing less than six pounds comprising:
    a pair of axially aligned drive wheels, each wheel having a maximum diameter;
    a body, the body comprising a housing extending between the drive wheels, the housing being disposed within a cylinder defined by the maximum diameters of the drive wheels, the housing defining a housing cavity containing a receiver, a transmitter, and a video camera connected to the transmitter, the housing including a key holding portion defining a key holding slot, the key holding slot having a key member insertion and withdrawal axis;
    a first magnet and a second magnet disposed inside the housing cavity, the magnets providing a magnetic flux field, each magnet being located near the key holding slot;
    a key member conforming to the key holding slot, the key member comprising a material with a relative electromagnetic permeability greater than 500 so that the magnetic flux field produced by the magnets changes when the key member is disposed in the key holding slot, wherein the magnets produce a first, undeformed magnetic field while the key member is disposed in the key holding slot and the magnets produce a second, deformed magnetic field while the key member is not disposed in the key holding slot;
    a magnetic field sensor disposed inside the housing cavity, the magnetic field sensor being positioned between the first magnet and the second magnet, the magnetic field sensor providing a first output signal when the first, undeformed magnetic field is present and a second output signal when the second, deformed magnetic field is present.

2. The throwable surveillance robot of claim 1 wherein the presence of the key member in the key holding slot defined by a key member receiving structure alters a magnitude of the magnetic field produced by the magnets at the magnetic field sensor, the magnetic field produced by the magnets having a first magnitude at the magnetic field sensor when the key member is present in the key holding slot and a second magnitude at the magnetic field sensor when the key member is absent from the key holding slot.

3. The throwable surveillance robot of claim 1 wherein the presence of the key member in the key holding slot defined by a key member receiving structure alters an angle of flux lines in the magnetic field produced by the magnets at the magnetic field sensor, the flux lines in the magnetic field produced by the magnets having a first angle at the magnetic field sensor when the key member is present in the key holding slot and a second angle at the magnetic field sensor when the key member is absent from the key holding slot.

4. The throwable surveillance robot of claim 1 wherein the first output signal is a logical one and the second output signal is a logical zero or the first output signal is a logical zero and the second output signal is a logical one.

5. The throwable surveillance robot of claim 1 wherein the magnetic field sensor comprises a Hall effect sensor.

6. The throwable surveillance robot of claim 1 wherein the key member is configured as a plate with opposing planar sides.

7. The throwable surveillance robot of claim 1 wherein the key member is configured as a plate with opposing planar sides, each opposing planar side having a rectangular shape.

8. The throwable surveillance robot of claim 1 wherein the key member has a parallelepiped three dimensional shape.

9. The throwable surveillance robot of claim 1 wherein the housing includes a wall portion separating the key holding slot from the housing cavity.

10. The throwable surveillance robot of claim 1 further comprising a key retention mechanism comprising a key engaging element that is slidingly supported by the housing and a coil spring that biases the key engaging element toward the key member.

11. The throwable surveillance robot of claim 10 wherein the key member defines a notch that is positioned and dimensioned to receive a distal portion of the key engaging element.

12. A throwable remotely controlled robot comprising:
a housing defining a housing cavity;
a pair of magnets arranged in opposite polarity disposed inside the housing, the pair of magnets generating a magnetic field;
an enable/disable sensor disposed inside the housing cavity defined by the housing, the sensor being positioned in proximity to the pair of magnets, the sensor providing a first output signal when a first, undeformed magnetic field is present and a second output signal when a second, deformed magnetic field is present; and
a key member formed of a material to modify the magnetic field,
wherein the throwable remotely controlled robot has a total weight of less than six pounds.

13. The robot of claim 12 wherein the sensor is a vertically-polarized sensor and is positioned between the two magnets.

14. The robot of claim 12 wherein the key member is made of steel.

15. The robot of claim 14 wherein the key member creates an increased vertical field component to enable the sensor.

16. The robot of claim 15 wherein the housing includes a key holding portion defining a key holding slot.

17. The robot of claim 12 wherein the key member has a shape conforming to the key holding slot.

18. A throwable remotely controlled robot with a housing and an enable/disable sensor comprising a pair of magnets generating a magnetic field, and a sensor positioned therebetween, the sensor requiring a specific modification of the magnetic field to actuate the sensor, and further comprising a key plate formed of a material to modify the magnetic field to enable the robot.

* * * * *